United States Patent [19]

Knauer et al.

[11] Patent Number: 4,893,269
[45] Date of Patent: Jan. 9, 1990

[54] ADDER CELL FOR CARRY-SAVE ARITHMETIC

[75] Inventors: Karl Knauer, Grafing; Winfried Kamp, Munich, both of Fed. Rep. of Germany

[73] Assignee: Siemens Aktiengesellschaft, Berlin and Munich, Fed. Rep. of Germany

[21] Appl. No.: 324,807

[22] Filed: Mar. 17, 1989

[30] Foreign Application Priority Data

Apr. 29, 1988 [DE] Fed. Rep. of Germany ....... 3814639

[51] Int. Cl.$^4$ ............................................. G06F 7/50
[52] U.S. Cl. ................................................... 364/784
[58] Field of Search ................................ 364/784–786

[56] References Cited

U.S. PATENT DOCUMENTS

| | | | |
|---|---|---|---|
| 4,621,338 | 11/1986 | Uhlenhoff | 364/784 |
| 4,713,790 | 12/1987 | Kloker et al. | 364/784 |
| 4,730,266 | 3/1988 | van Meerbergen et al. | 364/787 |
| 4,733,365 | 3/1988 | Nagamatsu | 364/784 |
| 4,839,849 | 6/1989 | Knauer | 364/784 |

OTHER PUBLICATIONS

Kai Kwang, "Computer Arithmetic Principles, Architecture, and Design", 1979, pp. 69–127.

*Primary Examiner*—Gary V. Harkcom
*Assistant Examiner*—Tan V. Mai
*Attorney, Agent, or Firm*—Hill, Van Santen, Steadman & Simpson

[57] ABSTRACT

An adder cell in which the sum signal and the carry signal are formed with equal speed is provided for employment in "carry-save" adders, wherein the sum signal and the carry signal are separately forwarded to separate inputs of following adder cells. The circuit of the adder cell is designed such that the sum signal as well as the carry signal each have to traverse only two gates, so that the running times of sum signal and carry signal are approximately identical and shorter than the maximum running time of conventional adder cells.

3 Claims, 2 Drawing Sheets

FIG 3

| A | B | $C_i$ | S | $C_o$ |
|---|---|---|---|---|
| 0 | 0 | 0 | 0 | 0 |
| 0 | 1 | 0 | 1 | 0 |
| 1 | 0 | 0 | 1 | 0 |
| 1 | 1 | 0 | 0 | 1 |
| 0 | 0 | 1 | 1 | 0 |
| 0 | 1 | 1 | 0 | 1 |
| 1 | 0 | 1 | 0 | 1 |
| 1 | 1 | 1 | 1 | 1 |

4,893,269

ADDER CELL FOR CARRY-SAVE ARITHMETIC

BACKGROUND OF THE INVENTION

The invention is directed to an adder cell for constructing a carry-save adder.

A carry-save adder is known from the book "Computer Arithmetic" by K. Hwang, John Wiley and Sons, New York, 1979, pages 98 through 103 particularly FIG. 4.1 and FIG. 4.2. Every first adder cell has three inputs, each of which receives equivalent bits of three binary numbers to be added to one another. The carry-save adder of FIG. 4.1 is composed of n adder cells that are also referred to as a full adder. The carry output of every adder cell is intermediately stored in a carry-save register and is supplied to the next higher adder cell. A combination between a carry-save and carry-propagate adder, by contrast, is shown in FIG. 4.2. The sum outputs of the first carry-save adder cells are conducted to first inputs of the carry-propagate adder; the carry outputs of the first adder cells (with the exception of the most significant adder cell) are linked via carry-save registers to second inputs of the carry-propagate adder. A sum word resulting from the addition appears at the outputs of the carry-propagate adder. Differing from an adder arrangement using the carry-propagate principle, the carries of all first adder cells, in an addition to three binary numbers, are simultaneously formed and, in addition to the intermediate sum word taken at the first adder cells, are available as a carry word. An adder constructed in this fashion functions according to the "carry-save" principal.

In conventional adder cells, the sum running time is usually considerably longer than the carry running time. The reason for this difference is that the sum signal must traverse a greater number of logical gates. These different running times are rather meaningful given "carry-propagate" adders such as, for example, the "carry-ripple" adder because the carry signal must traverse many stages, while the sum signal traverses only one stage. However, the situation is different for "carry-save" adders, in which the sum signal and the carry signal are separately forwarded to arbitrary inputs of following adders. It is advantageous that the sum signal and carry signal be formed with identical speed, insofar as possible.

SUMMARY OF THE INVENTION

The object of the invention is to provide adder cells for "carry-save" adders wherein a sum signal and a carry signal are formed approximately at the same time and very quickly. This is achieved by the present invention.

The advantage obtainable with the invention is particularly that the signals at the sum input and carry input each need to traverse only two gates in order to reach the adder output, and that a low number of switching transistors is required for constructing the adder cell of the invention.

SUMMARY OF THE DRAWINGS

The invention shall be set forth in greater detail below with reference to an exemplary embodiment shown in the drawings, in which:

FIG. 3 illustrates a function table for the adder cells of FIG. 1 and FIG. 2.

DESCRIPTION OF THE PREFERRED EMBODIMENTS

Figure 1:
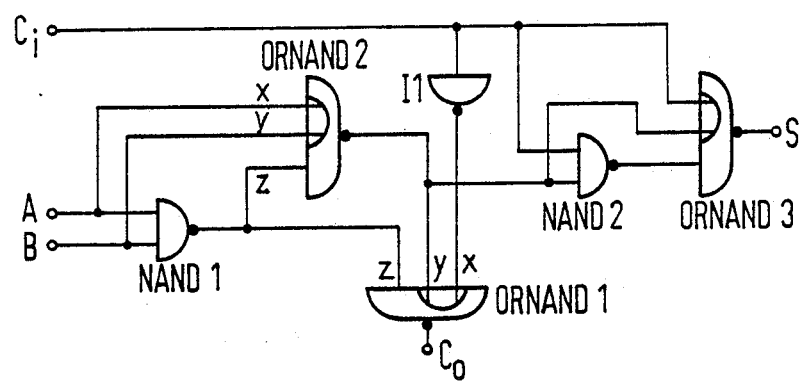
FIG. 1 shows a conventional adder cell.

FIG. 1 shows a conventional adder cell that is composed of three ORNAND Gates ORNAND1, ORNAND2, ORNAND3, two NAND Gates NAND1, NAND2 and an inverter I1. The ORNAND gates each have two OR inputs (X and Y) and one AND input (Z) and produce an output signal corresponding to $(X+Y).Z$. The adder cell contains three inputs; two thereof are sum operand inputs A, B, whereas the third input is intended for the carry $C_i$; the adder cell also contains two outputs, one sum output S and one carry output $C_0$. The carry input $C_i$ is connected via an inverter I1 to a first OR input of the first ORNAND Gate ORNAND1, whereas the operand inputs A, B are each connected to an input of a first NAND Gate NAND1 and to a respective OR input of a second ORNAND Gate ORNAND2. The output of the NAND Gate NAND1 is connected both to the AND input of the second ORNAND Gate ORNAND2 as well to the AND input of the first ORNAND Gate ORNAND1. The output of the first ORNAND Gate ORNAND1 thereby forms the carry output $C_0$ of the conventional adder cell.

The output of the second ORNAND Gate ORNAND2 is wired, first, to the second OR input of the first ORNAND Gate ORNAND1, to a first input of the second NAND Gate NAND2, as well as to the first OR input of the third ORNAND Gate ORNAND3. The carry input $C_i$ of the adder cell, finally, is wired to the second input of the second NAND Gate NAND2 and to the second OR input of the third ORNAND Gate ORNAND3, whereas the output of the second NAND Gate NAND2 is connected to the AND input of the third ORNAND Gate ORNAND3. The output of the third ORNAND Gate ORNAND3 thereby forms the sum output S.

In this conventional adder cell, the sum running time, i.e., the time that is required for the formation of the sum from the operand inputs A and B, is usually considerably longer than the carry running time. This is because the sum signal must traverse a greater plurality of gates. In order to form the sum signal in the adder cell of FIG. 1, a signal at the operand inputs A, B must respectively traverse a maximum of four gates; for the formation of the carry signal at the carry output $C_0$, a signal has to traverse only a maximum of three gates proceeding from the operand inputs A, B or, respectively, two gates proceeding from the carry input $C_i$. FIG. 3 illustrates a function table related to the conventional adder cell of FIG. 1, and which is also related to the "carry-save arithmetic" adder cell of the invention.

Figure 2:
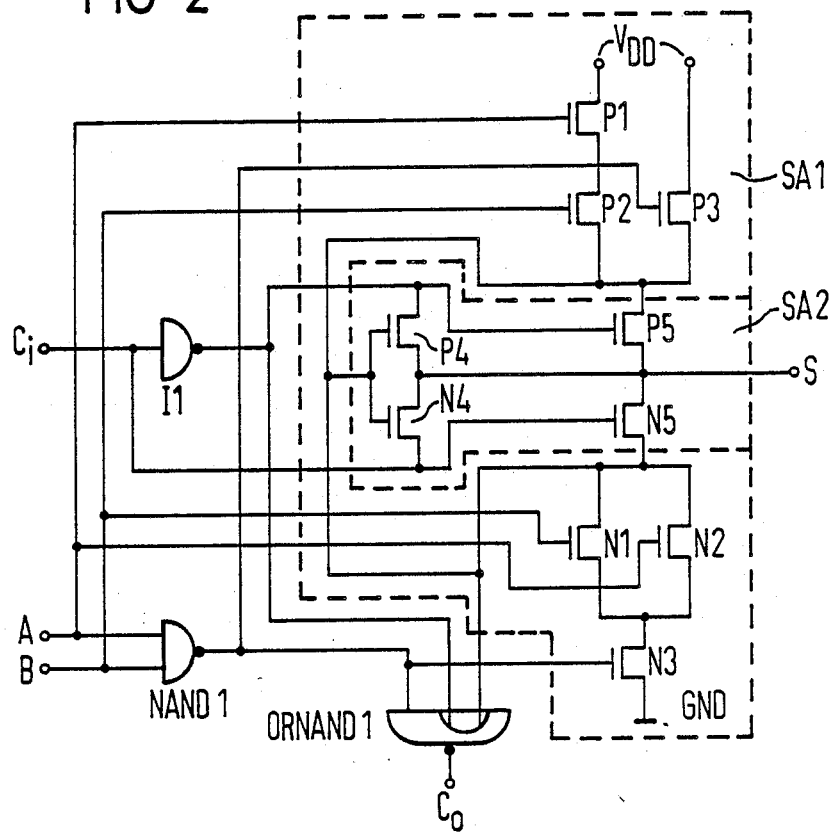
FIG. 2 is a schematic diagram of the adder cell of the present invention for "carry-save" arithmetic.

FIG. 2 shows the adder cell of the present invention for "carry-save" arithmetic. Just like the conventional adder cell, it comprises three inputs, namely two sum operand inputs A, B and one carry input $C_i$. It also comprises two outputs, a sum output S and a carry output $C_0$ The adder cell of the invention contains a NAND Gate NAND1, and ORNAND Gate ORNAND1, as well as an inverter I1, analogous to the conventional adder cell. The operand inputs A and B are each connected to an input of a first NAND Gate NAND1 at whose output the ORNAND Gate ORNAND1 has its AND input connected. The carry input $C_i$ is connected via an inverter I1 to the first OR input of the ORNAND Gate ORNAND1, whereas the output of the ORNAND Gate ORNAND1 forms the carry output $C_0$ of the adder cell of the invention. Further, the two operand inputs A, B and the output of the NAND Gate NAND1 are connected to a first circuit arrangement SA1 (shown in broken lines) and the carry input $C_i$ and the output of the inverter I1 are connected to a second circuit arrangement SA2 (shown in broken lines). A first output of SA1 is wired to a second OR input of the ORNAND Gate ORNAND1 and a second, third and fourth output SA1 are wired to the second circuit arrangement SA2; one output of SA2 forms the sum output S.

The first circuit arrangement SA1 contains three p-channel and three n-channel switching transistors P1, P2, P3 and N1, N2, N3, in which a first and second p-channel switching transistor P1, P2 form a first series circuit and a third p-channel switching transistor P3 is connected in parallel thereto. A first terminal of the first series circuit and a first terminal of third p-channel switching transistor P3 are connected to a supply voltage $V_{DD}$, whereas a second terminal of the third p-channel switching transistor P3 is connected to a second terminal of the first series circuit and, further, to a first terminal of a first parallel circuit composed of a first of a second n-channel switching transistor N1, N2 and, via a first output of the first circuit arrangement SA1, to a second OR input of the ORNAND Gate ORNAND1 and, via a second, third and fourth input of the first circuit arrangement SA1, is connected to the second circuit arrangement SA2.

A second terminal of the first parallel circuit is wired via a third n-channel switching transistor N3 to ground GND, whereas the first operand input A is connected to a gate of the first p-channel switching transistor P1 and to a gate of the second n-channel switching transistor N2 and the second summand input B is connected to a gate of the second p-channel switching transistor P2 and to a gate of the first n-channel switching transistor N1. The output of the NAND Gate NAND1, further, is connected to a gate of third p-channel switching transistor P3 and to a gate of the third n-channel switching transistor N3.

Two p-channel switching transistors P4, P5 as well as two n-channel switching transistors N4 and N5, are located in the second circuit arrangement SA2. A first terminal of the fourth p-channel switching transistor P4 is connected to an output of the inverter I1 and to a gate of a fifth p-channel switching transistor P5. A first terminal of the fourth n-channel switching transistor N4 is connected to the carry input $C_i$ and to a gate of a fifth n-channel switching channel N5. The fifth p-channel switching transistor P5 and the fifth n-channel switching transistor N5 form a second parallel circuit, whereby a first terminal of the fifth p-channel switching transistor P5 is connected to the first circuit arrangement SA1 via a second output of the first circuit arrangement SA1, a first terminal of the fifth n-channel switching transistor N5 is connected to the first circuit arrangement SA1 via a third output of the first circuit arrangement SA1 and gate terminals of the fourth p-channel switching transistor P4 and of the fourth n-channel switching transistor N4 are connected to the first circuit arrangement SA1 via a fourth output of the first circuit arrangement SA1. The sum output S is thus respectively connected both to the second terminal of the fourth p-channel switching transistor P4 and of the fourth n-channel switching transistor N4 as well as being respectively connected to the second terminal of the fifth p-channel switching transistor P5 and of the fifth n-channel switching transistor N5.

In the adder cell of the invention, the second ORNAND Gate ORNAND2 that was described in connection with FIG. 1, was (functionally) parted in the middle and the two n-channel and p-channel switching transistors N5 and P5 were inserted, these being driven by the carry signal or, respectively, by the inverted carry signal. In addition, the two n-channel and p-channel switching transistors N4 and P4 were inserted, these being driven by the output signal of the second ORNAND Gate ORNAND2 and transmitting the carry signal or, respectively, the inverted carry signal. The adder cell then functions such that, given an identity of the input signals at the operand inputs A and B, the carry input signal at the carry input $C_i$ is transmitted to the sum output S via the fourth n-channel switching transistor N4 and given a non-identity of the operand inputs A and B, the inverted carry input signal at the carry input $C_i$ is transmitted to the sum output S via the fourth p-channel switching transistor P4. The fifth n-channel switching transistor N5 and the fifth p-channel switching transistor P5 thereby intensify this charge flow whenever a "1" is to be transmitted via the fourth n-channel switching transistor N4 or a "0" is to be transmitted via the fourth p-channel switching transistor P4 and thus avoid a drop by a threshold voltage of the switching transistors N4 or, respectively, P4. As a result of this structure of the adder cell of the invention, the signals both from the operand inputs A, B as well as from the carry input $C_i$ need to traverse only two gates to the sum output S or, respectively, to the carry output $C_0$. Simulations with realized adder cells confirm that these running times of sum signal and carry signal are approximately identical and shorter than the maximum running time for signals in a conventional adder cell.

FIG. 3 shows a function table for the adder cell of FIG. 1 and for the inventive adder cell of FIG. 2. One can thereby see that the sum output S is equal to "1" when the operand inputs are A=0, B=1 and the carry input is $C_i$=0 or when the operand input is A=1, B=0 and the carry input is $C_i$=0 or when the operand inputs are A=0, B=0 and the carry input is $C_i$=1 or when the operand inputs are A=1 and B=1 and the carry input is $C_i$=1. The carry output $C_0$ contains a "1" precisely when the operand inputs are A=1, B=1 and the carry input is $C_i$=0 or when the operand inputs are A=0, B=1 and the carry input is $C_i$=1 or when the operand inputs are A=1, B=0 and $C_i$=1 or when the operand inputs are A=1, B=1 and the carry input is likewise 1. For all other input combinations of the operand inputs A, B and of the carry input $C_i$, the sum output S and the carry output $C_0$ are set to "0".

It will be understood that variations and modifications may be effected without departing from the spirit and scope of the novel concepts of the present invention.

IT IS CLAIMED:

1. An adder cell for carry-save arithmetic, comprising an inverter (I1), an NAND Gate (NAND1) and an ORNAND Gate (ORNAND1), means connecting a first and a second sum operand input (A, B) to the NAND Gate (NAND1), means for connecting a carry input ($C_i$) to the inverter (I1), means connecting an output of the NAND Gate (NAND1) to an AND input of the ORNAND Gate (ORNAND1), means for connecting an output of the inverter (I1) to a first OR input of the ORNAND Gate (ORNAND1), a first circuit arrangment (SA1), means for connecting the first and second operand inputs (A, B) and the output of the NAND Gate (NAND1) to said first circuit arrangement (SA1), a second circuit arrangement (SA2), means for connecting the carry input and the output of the inverter (I1) to said second circuit arrangement (SA2); means for connecting a first output of said first circuit arrangement (SA1) to a second OR input of said OR-NAND Gate (ORNAND1), and means for connecting a second, third and fourth output of the first circuit arrangement (SA1) to the second circuit arrangement (SA2); whereby an output of the second circuit arrangement (SA2) forms a sum output (S) and an output of the ORNAND Gate (ORNAND1) forms a carry output ($C_0$).

2. An adder cell according to claim 1, wherein said first circuit arrangement (SA1) contains a first, a second and a third p-channel switching transistor and a first, a second and a third n-channel switching transistor (P1, P2, P3; N1, N2, N3); said first and second p-channel switching transistors (P1, P2) forming a first series circuit and the third p-channel switching transistor (P3) being connected in parallel with said first series circuit; means for a first terminal of the third p-channel switching transistor (P3) and means for a first terminal of the first series circuit to a supply voltage ($V_{DD}$), means for connecting a second terminal of said third p-channel switching transistor (P3) and a second terminal of said first series circuit to a first terminal of a first parallel circuit composed of a first and second n-channel switching transistor (N1, N2), and to a second OR input of the ORNAND Gate (ORNAND1); means for connecting a second terminal of the first parallel circuit to ground (GND) via a third n-channel switching transistor (N3); means for connecting the first sum operand input (A) to a gate of the first p-channel switching transistor (P1) and to a gate of the second n-channel switching transistor (N2), means for connecting the second operand input (B) to a gate of the second p-channel switching transistor (P2) and to a gate of the first n-channel switching transistor (N1), and means for connecting the output of the NAND Gate (NAND1) to a gate of the third p-channel switching transistor (P3) and to a gate of the third n-channel switching transistor (N3).

3. An adder cell according to claim 2, characterized in that the second circuit arrangement (SA2) contains a fourth and fifth p-channel switching transistor (P4, P5) and a fourth and fifth n-channel switching transistor (N4, N5); means for connecting a first terminal of the fourth p-channel switching transistor (P4) to the output of the inverter (I1) and to a gate of the fifth p-channel switching transistor (P5), means for connecting a first terminal of the fourth n-channel switching transistor (N4) to the carry input ($C_i$) and to a gate of the fifth n-channel switching transistor (N5); said fifth p-channel switching transistor (P5) and said fifth n-channel switching transistor (N5) being connected to form a second parallel circuit; means for connecting a first terminal of the fifth p-channel switching transistor (P5) to the first circuit arrangement (SA1) via a second output of the first circuit arrangement (SA1), means for connecting a first terminal of the fifth n-channel switching transistor (N5) to the first circuit arrangement (SA1) via a third output of the first circuit arrangement (SA1), means for connecting the gate terminal of the fourth p-channel switching transistor (P4) and the gate terminal of the fourth n-channel switching transistor (N4) to the first circuit arrangement (SA1) via a fourth output of the first circuit arrangement (SA1); means for connecting the sum output (S) in common to the second terminal of the fourth p-channel switching transistor and to the second terminal of the fourth n-channel switching transistor (P4, N4) and to the second terminal of the fifth p-channel switching transistor and to the second terminal of the fifth n-channel switching transistor (P5, N5).

* * * * *